United States Patent [19]

Szwarc

[11] Patent Number: 4,512,960
[45] Date of Patent: Apr. 23, 1985

[54] METHOD OF GAS PURIFICATION AND SYSTEM THEREFOR

[75] Inventor: Raphael Szwarc, Largo, Fla.

[73] Assignee: The United States of America as represented by the United States Department of Energy, Washington, D.C.

[21] Appl. No.: 566,621

[22] Filed: Dec. 29, 1983

[51] Int. Cl.³ .............................................. B01D 53/34
[52] U.S. Cl. .................................. 423/219; 423/262; 423/289; 423/344; 423/351; 252/181.4; 252/181.7; 420/400
[58] Field of Search ...................... 423/210, 210.5, 219, 423/262, 351, 289, 344, 351; 420/400; 252/181.4, 181.7

[56] References Cited

U.S. PATENT DOCUMENTS

| 1,555,570 | 9/1925 | Haynes | 423/210.5 |
| 1,769,025 | 7/1930 | Hendry | 423/262 |
| 2,204,501 | 6/1940 | Krauss | 423/262 |
| 3,273,970 | 9/1966 | Priscu et al. | 423/210.5 |
| 3,957,532 | 5/1976 | Settle et al. | 420/400 X |
| 4,092,263 | 5/1978 | Zavitsanos | 252/181.4 |
| 4,110,111 | 8/1978 | Wang | 420/400 X |

FOREIGN PATENT DOCUMENTS 1065535  9/1959  Fed. Rep. of Germany .

OTHER PUBLICATIONS

Matkovich, "Boron and Refractory Borides", Springer-Verlag, Berlin, Heidelberg, New York, 1977, pp. 268-269 and 291-292.
Dallek et al., "Thermal Analysis of Lithium-Boron Alloys", Journal of the Electrochemical Society, vol. 126, No. 5, May 1969, pp. 866-870.
The Condensed Chemical Dictionary, Van Nostrand Reinhold Company, New York, 8th Ed., p. 124.

Primary Examiner—Earl C. Thomas
Attorney, Agent, or Firm—Armand McMillan; Albert Sopp; Judson R. Hightower

[57] ABSTRACT

A method and device for conducting gettering. The gettering is conducted with one of an LiB, LiSi or LiAl system. Preferably the LiB system is of the formula $Li_xB_{1-x}$ wherein $0 < x < 1$ with gettering conducted at room or slightly elevated temperature of about 100°–200° C.

11 Claims, 2 Drawing Figures

METHOD OF GAS PURIFICATION AND SYSTEM THEREFOR

The U.S. Government has rights in this invention pursuant to Contract No. DE-AC04-76DP00656 between the U.S. Department of Energy and General Electric Company.

BACKGROUND OF THE INVENTION

This invention relates to a method of gas purification and a system therefor. More particularly, the invention relates to a method and device for gettering impurities such as oxygen, nitrogen and water from inert gases such as cover gases employed in a glove box.

It is known that reactive metals at elevated temperatures react readily with atmospheric gases, particularly oxygen and to some extent nitrogen, as well as with water. This characteristic has enabled them to be employed as so-called getters. In the prior art, it is also known that inert gases such as helium and argon often have trace amounts of, e.g., oxygen, nitrogen and water, and it is often required that they be purified by removal of as much as possible of their impurity content. Treatment of such gases with a reactive metal getter has therefore proved to be a convenient way of conducting the purification process.

Gettering devices generally have employed a body of reactive metal, such as titanium or zirconium sponge which is maintained at an elevated temperature of between, e.g., 800° and 1000° C. Typically, the gas to be purified is passed in contact with the reactive metal at this temperature. However, these systems have a disadvantage in that breakdowns in the operation of the gettering device tend to occur more readily at higher operational temperatures, and the effects of such breakdowns are greatly magnified as a result of the higher temperatures.

One such prior art device is, for example, disclosed in U.S. Pat. No. 3,273,970 to Priscu et al. which discusses the use of a reactive metal in a gettering device maintained at an elevated temperature of 800°-1000° C. In this device, the reactive metal getter is maintained in the molten state and the gas is brought in contact with the heated molten metal getter to effect purification thereof.

In an unrelated development, various light weight metal alloys have been prepared in the prior art which have high melting points, are ductile, maleable, machinable, and structurally strong. Typically, prior to the development of these alloys beryllium was previously used because it met many of these requirements, but by nature because it was too brittle and toxic, it created a number of problems in its use. One alloy proposed as a substitute was the recently developed lithium-boron alloys, the preparation of which is disclosed in U.S. Pat. No. 4,110,111 to Wang, whose disclosure is incorporated by reference herein.

It is also known from *Boron and Refractory Borides*, V. I. Matkovich, Page 268, Springer-Verlag, Berlin, Heidelberg, New York (1977), that although there is agreement about the existence, within the lithium-boron system of one or several phases, there is wide variation in the Li/B ratios from chemical analysis depending on the method of preparation. Thus, although it is possible to prepare such systems, it is not always possible to give precise formulas from elementary analysis alone.

According to S. Dallek, D. W. Ernst and B. F. Larrick, *Thermal Analysis of Lithium-Boron Alloys*, J. Electrochem. Society, 126, 6 (1979), it is known to use these lithium boron and other related alloys such as LiAl and LiSi systems in voltaic cells as anode materials. However, in use as an anode material it was found that these alloys, especially the lithium-boron compounds, are extremely reactive with components of the atmosphere.

SUMMARY OF THE INVENTION

It is thus an object of the present invention to provide an improvement in a method of gettering or purifying inert gases by contacting said inert gases with a lithium metal alloy system.

It is another object of the present invention to provide a method of purifying inert gases by contacting the inert gases with a gettering composition of a lithium boron alloy system.

Still another object of the present invention is to provide a method of purifying inert gases by contacting the inert gases with a gettering composition prepared in situ which gettering composition is an LiB system composition.

Yet still another object of the invention is to provide an improved gettering device which employs an LiB system as a gettering composition.

In one aspect, the invention comprises an improvement in a method of purifying inert gases by contacting the inert gases with a gettering composition, and the improvement residing in that the contacting is conducted with a composition of $Li_xB_{1-x}$ wherein $0 < x < 1$.

In another aspect, the invention comprises an improvement in a method of purifying the inert gases wherein the contacting is conducted with LiAl or LiSi system.

Upon further study of the specification and appended claims, further objects and advantages of this invention will become apparent to those skilled in the art.

The invention also comprises an improvement in a method of purifying inert gases by conducting the purification with a gettering composition of an LiB system wherein the composition is made by a process of, in situ, in an inert atmosphere, reacting a charge of lithium metal and a charge of boron powder. The lithium metal and boron powder are reacted in amounts sufficient to cause substantially complete reaction of substantially all of the lithium metal with substantially all of the boron powder, by heating the lithium metal and the boron powder at a first predetermined rate of temperature increase to a first temperature effective to cause commencement of a first exothermic reaction, and then further heating the product from the first exothermic reaction at a second predetermined rate of temperature increase less than the first predetermined rate to a second higher temperature effective to cause commencement of a second exothermic reaction terminating in production of the LiB system composition.

The invention also resides in an improved gettering device comprising a gas train for an inert cover gas, and with the gas train comprising a container arranged on line therewith and with a reagent contained therein for passing the inert cover gas through the container, in contact with the reagent, to remove impurities from the cover gas. The improvement resides in that the reagent is a composition of $Li_xB_{1-x}$ wherein $0 < x < 1$.

Advantages are provided by such a system in that gettering can be done much more effectively because the above-discussed metallic alloys are typically more reactive than a metal such as titanium or zirconium alone. In addition, the system can operate at ambient or low temperatures, typically low temperatures of 100°-200° C., whereas the, e.g., titanium or zirconium sponge systems, must operate at 800°-1000° C.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

The invention relates to the application of an LiB system as a getter for nitrogen, oxygen and water in an inert gas train, which inert gases are employed as a cover gas in a glove box. In another aspect, the invention relates to the application of LiSi and LiAl systems as getters for nitrogen, oxygen and water.

It is known that lithium and boron form a great number of phases with varying LiB ratios as discussed previously. The precise chemical formulas of the phases are not available due to difficulties in chemical analysis, as well as the presence of impurities therein. In a specific aspect, the invention relates primarily to the lithium rich phases disclosed by Wang in U.S. Pat. No. 4,110,111 of Aug. 29, 1978 whose disclosure was previously incorporated by reference. These lithium boron systems are conventional in nature and the preparation thereof is known. In a more specific aspect it is preferable to employ a lithium-boron alloy with a composition in the range of 50-80 weight percent, more preferably 54-78 weight percent lithium. Such alloys are disclosed in the above-referenced Dallek et al. article, whose disclosure is also incorporated by reference.

Generally, the preferred compound is that identified in the prior art to be $Li_7B_6$ which is extremely reactive, and as applied in the present invention is highly effective in gettering nitrogen, oxygen and water from inert cover gases in a glove box. More particularly, based on the quantity of nitrides picked up from cover gas in a glove box, $Li_7B_6$ is a superior getter to both molten elemental lithium as well to heated titanium or zirconium sponge which have been the conventional substances applied in commercial systems. In a still more specific aspect, it is preferred that the alloy have a composition range of 60-75 atomic weight percent lithium.

The compound $Li_7B_6$, hereinafter referred to as the reagent, is typically porous when prepared according to the above-discussed method, and due to its reactivity and high surface area is extremely difficult to handle without contaminating it with the environment. In order to overcome these difficulties, the reagent itself is not provided in the purification system, and instead is manufactured from its two components in situ. In a preferred aspect, a charge of lithium metal and boron powder are provided in a weight ratio of 41:49, preferably 42:48, more preferably 43:47 in the container shown in FIG. 1 as is discussed hereinafter.

Figure 1:
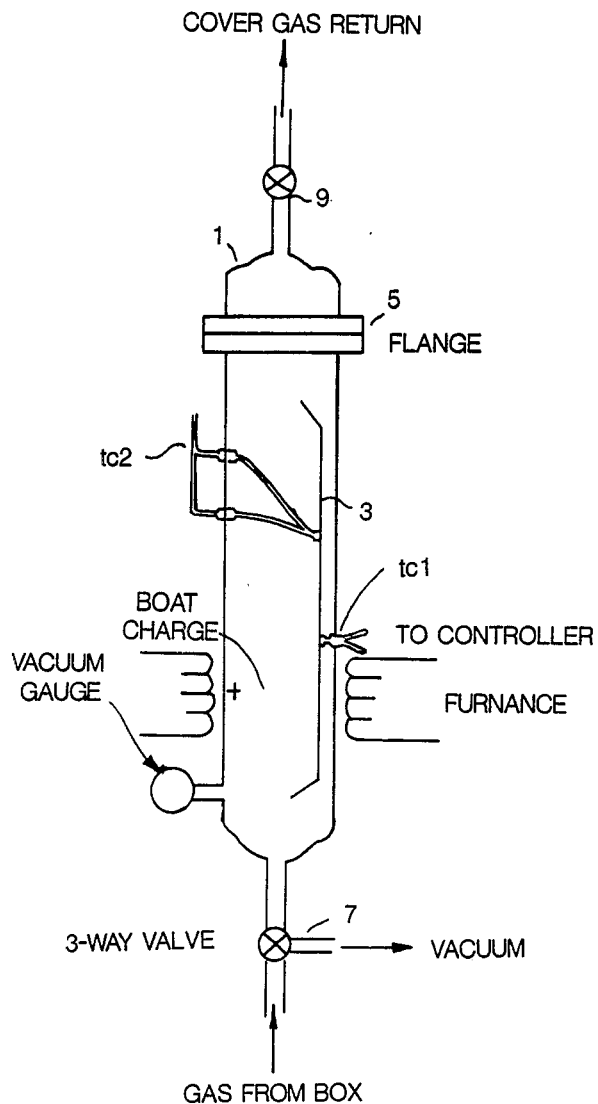
FIG. 1 is a schematic drawing of a canister employed for preparing the gettering composition of the invention, and for conducting purification of inert gas in a gas train as employed in the invention.

The device shown in FIG. 1 typically includes a stainless steel canister built so as to withstand atmospheric pressure under vacuum. The size of the device is such as to provide sufficient gettering for the box and/or required inert gas flow rate therethrough. The canister 1 includes a boat 3 which is removably placed therein and can be moved out of the canister by opening up the canister 1 at the flange 5. The boat 3 is long and shallow and holds the reagent while at the same time serving as a reaction vessel for the lithium and boron powder charge. Two thermocouples tc1 and tc2 are attached to the boat 3 and connected to the exterior of the canister by means of a stainless steel tube providing for vacuum lead-throughs for the thermocouples. Thermocouple tc1 is connected to a controller and to a conventional chart recorder, and thermocouple tc2 is also connected to the recorder. Thus, recording of the boat temperature during reaction can be effected to ensure that the reaction has been conducted to completion. As noted, the thermocouples are flexible to permit loading of the boat, with the loading being effected through the removable end of the canister at the flange 5.

The canister also includes two valves, an inlet valve 7, which is typically a 3-way valve upstream thereof to permit evacuation and flushing of the system through a vacuum source, and a second valve 9 at the outlet source which returns the cover gas to the box and to permit cover (inert) gas circulation through the box. The container 1 is wrapped with resistance winding adapted for heating the interior thereof to a temperature of typically up to at least 600° C., and preferably 800°-1000° C. The furnace is controlled to permit the reaction heating schedule discussed hereinafter. The control of these elements is conventional and well known to those of ordinary skill in the art and will not be discussed in further detail herein.

In effecting the preparation of the reagent in situ, prior to performing the gettering operation, the canister or container 1 is evacuated and flushed with inert cover gas, typically at least twice to ensure that impurities are removed therefrom. A vacuum of approximately 1 torr is then pulled by the systems pump (not shown) and heating to about 170°-230° C., preferably 180°-220° C., more preferably 200° C., is commenced at the maximum rate allowable by the furnace windings, typically 7° C./min.

After reaching the first temperature level, a first exothermic reaction is commenced, and the heating rate is then reduced to typically about 1° C./min until a second temperature level of about 370° C.-430° C., preferably 380° C.-420° C., and more preferably 400° C., is reached at which time the rate is then further reduced to typically about 0.5° C./min and the power is shut off once the second exothermic reaction is initiated.

Figure 2:
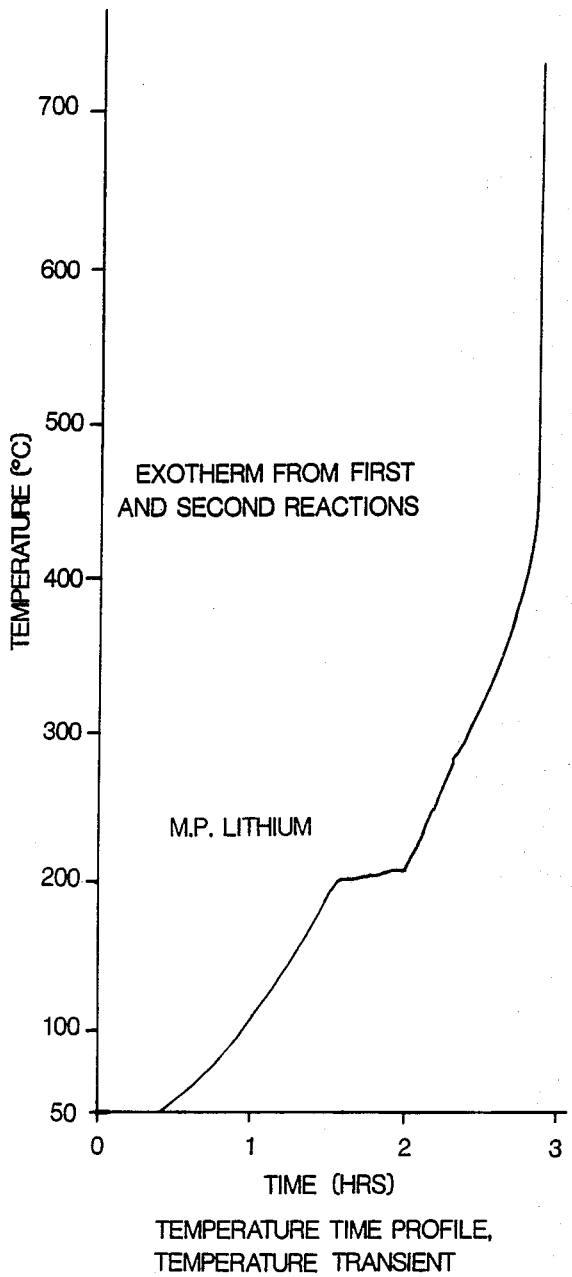
FIG. 2 is a graph showing the temperature/time profile of the charge being reacted in the canister during in situ preparation of the lithium boron composition system.

The start of the second exothermic reaction is evidenced by a rapid temperature rise, as illustrated in FIG. 2, which shows the general temperature rise throughout the entire sequence. At this point, the power is shut off and an inert gas, e.g., argon, is bled into the system by opening valve 7 and keeping valve 9 closed to permit a pressure of about 500-600 torr to form, which serves as a gas quench to minimize sintering of the reagent, which if such sintering occurred would decrease the reagent's effectiveness due to reduced surface area.

Following preparation of the reagent, the gas train is then ready for purification and may be operated at room temperature, or if it is desired to increase the rate of reaction, at a moderately increased temperature such as 100°-200° C. during cover gas purification. During purification, the temperature on the strip chart is recorded to provide an indication of the remaining reactivity of the reagent. So long as the reagent is reactive, it will generate heat during the gettering operation, and as soon as insufficient heat is generated, then this is an indication that the reagent has to be removed and a new reagent provided.

In deciding how much reagent to employ for a cover gas of e.g., argon, the amount of impurity of e.g., nitrogen in the cover gas in ppm must be known as well as the gas flow rate. Once these factors are known then it is a conventional procedure to those of ordinary skill in the art to calculate how much reagent charge is necessary to effect purification for a predetermined time period of, e.g., 4 hours.

Typically, this system is employed for cover gas purification of $O_2$, $H_2O$ and $N_2$. However, the effective life thereof can be increased by the use of another train upstream to remove oxygen and water prior to conducting the gettering through the reagent system. More particularly, the additional train upstream can be a conventional titanium or zirconium sponge stream and/or another related alloy.

As previously discussed, in addition to the lithium boron system, a lithium aluminum or lithium silicon system such as those available commercially from Foote Mineral Company for anode applications, can be used. The LiSi system is typically 44 weight percent ±10% lithium and the LiAl system is typically 20 weight percent ±10% lithium. These systems need not be prepared in situ since they are not as reactive as the lithium boron system, but nonetheless, still provide better gettering than the conventional heated titanium or zirconium sponge, or elemental Li as normally provided in prior art commercial systems.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

Prior to preparing the reagent, after loading the boat of the system of FIG. 1 with the lithium and boron, the canister is evacuated and flushed with inert cover gas at least twice. A maximum vacuum of approximately 1 torr is pulled by the systems pump and heating to 200° C. is started at the maximum rate allowable by the furnace windings, i.e., 7° C./min. As illustrated in FIG. 2 in the temperature time profile, this causes the commencement of a first exothermic reaction. From 200° C. to 400° C., the heating rate is reduced to 1° C./min and beyond 400° C., the rate is further reduced to 0.5° C./min and the power is shut off once the second exothermic reaction has been initiated. This is evidenced in FIG. 2 as a rapid temperature rise after 400° C. Argon is then fed into the system by opening the valve 7 to permit a pressure of about 500-600 torr to build up which serves as a gas quench minimizing sintering of the reagent which would otherwise decrease its effectiveness. Thus, the reagent for conducting gettering has been prepared.

EXAMPLE 2

Following preparation of the reagent as prepared in Example 1, the gas train is operated at room temperature and cover gas fed through valve 7 in contact with the reagent and out through valve 9, and then returned to the glove box. The temperature of the reagent is monitored by thermocouples tc1 and tc2, and recorded on a strip chart recorder to indicate the reactivity of the reagent. When the temperature recorded decreases, i.e., because the reagent no longer generates heat, the gettering operation is shut off, the inactive reagent removed and a new charge of reagent prepared as in Example 1.

EXAMPLE 3

Gettering is conducted as in Example 2, but at an increased temperature of 100°-200° C. The rate of purification is greater than in Example 2, and temperature is again recorded until no heat is generated at which time a new reagent is prepared as in Example 1.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

For example, the effective life of the reagent can be increased by use of another train up stream to remove oxygen and water. Thus, the system of the invention is employed to remove essentially only nitrogen thereby increasing reagent life. Furthermore, although the primary use is in gettering oxygen, water and nitrogen, the invention can be used to getter other substances with which the reagent is reactive as will become obvious to those of ordinary skill in the art.

What is claimed is:

1. In a method of purifying inert gases by contacting said, gases with a gettering composition to remove water, oxygen and nitrogen, the improvement wherein said contacting is conducted with a composition of one of $Li_x B_{1-x}$, LiAl and LiSi, and wherein $0 < x < 1$, said LiAl composition is 10-30 weight percent lithium, and said LiSi composition is 34-54 weight percent lithium.

2. A method as in claim 1, wherein said gettering composition is $Li_7B_6$.

3. A method as in claim 1, wherein said gettering is conducted at ambient temperature.

4. A method as in claim 1, wherein said gettering is conducted at a temperature of about 100°-200° C.

5. A method as in claim 1, wherein said gettering is conducted with sufficient gettering composition effective to remove impurities from a cover gas over a time period of at least four hours.

6. A method as in claim 1, wherein said gettering is conducted with a lithium-boron alloy with a composition in the range of about 54-78 weight percent lithium.

7. In a method of purifying inert gases by contacting said gases with a gettering composition to remove water, oxygen, and nitrogen, the improvement wherein said contacting is with an LiB composition prepared by a process comprising, reacting in situ in an inert nitrogen-free atmosphere or in vacuo a charge of lithium metal and a charge of boron powder, in amounts sufficient to cause substantially complete reaction of substantially all of said lithium metal with substantially all of said boron powder, by heating said lithium metal and boron powder at a first predetermined rate of temperature increase to a first temperature effective to cause commencement of a first exothermic reaction, and then further heating the product from said first exothermic reaction at a second predetermined rate of temperature increase less than said first predetermined rate to a second higher temperature effective to cause commencement of a second exothermic reaction terminating in production of said LiB composition.

8. A method as in claim 7, wherein said heating to said first temperature is conducted to about 180°–220° C., and said heating to said second temperature is conducted to about 380°–420° C.

9. A method as in claim 7, wherein the amount of lithium and boron reacted is sufficient to produce sufficient reagent to conduct gettering for at least 4 hours.

10. A method as in claim 7, wherein the weight ratio of Li to B reacted is about 42:48.

11. A method as in claim 7, wherein said LiB composition is porous.

* * * * *